United States Patent [19]

Fletcher et al.

[11] 4,075,057

[45] Feb. 21, 1978

[54] NON-EQUILIBRIUM RADIATION NUCLEAR REACTOR

[76] Inventors: James C. Fletcher, Administrator of the National Aeronautics and Space Administration with respect to an invention of; Karlheinz Thom, Gaithersburg, Md.; Richard T. Schneider, Gainesville, Fla.

[21] Appl. No.: 560,891

[22] Filed: Mar. 21, 1975

[51] Int. Cl.² .............................................. G21C 1/22
[52] U.S. Cl. ...................................... 176/39; 330/4.3; 331/94.5 P; 331/94.5 G
[58] Field of Search ............... 176/39, 45; 331/94.5 P, 331/DIG. P, 94.5 G; 60/203; 330/4.3

[56] References Cited

U.S. PATENT DOCUMENTS

| | | | |
|---|---|---|---|
| 2,874,109 | 2/1959 | Cooper | 176/86 L |
| 2,990,358 | 6/1961 | Manley | 176/86 L |
| 3,223,591 | 12/1965 | McLafferty | 176/39 |
| 3,528,884 | 9/1970 | Collier et al. | 176/37 |
| 3,865,688 | 2/1975 | Kleimola | 176/38 |

OTHER PUBLICATIONS

AIAA Paper, 71-110 (1/71).
AIAA Journal (4/72) pp. 400-406.
AEB - Conf - 64-081 - 45.
S 27.3 0119.
"Nuclear Reactor Theory," Lamarsh, (1966), Addison-Wesley Publishing Co., Reading, Mass., p. 93.
NASA CR-72781, Lofthouse et al. (2/71).

*Primary Examiner*—Samuel W. Engle
*Assistant Examiner*—S. A. Cangialosi
*Attorney, Agent, or Firm*—Nina M. Lawrence; John R. Manning; Robert Kinberg

[57] ABSTRACT

An externally moderated thermal nuclear reactor is disclosed which is designed to provide output power in the form of electromagnetic radiation. The reactor is a gaseous fueled nuclear cavity reactor device which can operate over wide ranges of temperature and pressure, and which includes the capability of processing and recycling waste products such as long-lived transuranium actinides. The primary output of the device may be in the form of coherent radiation, so that the reactor may be utilized as a self-critical nuclear pumped laser.

18 Claims, 2 Drawing Figures

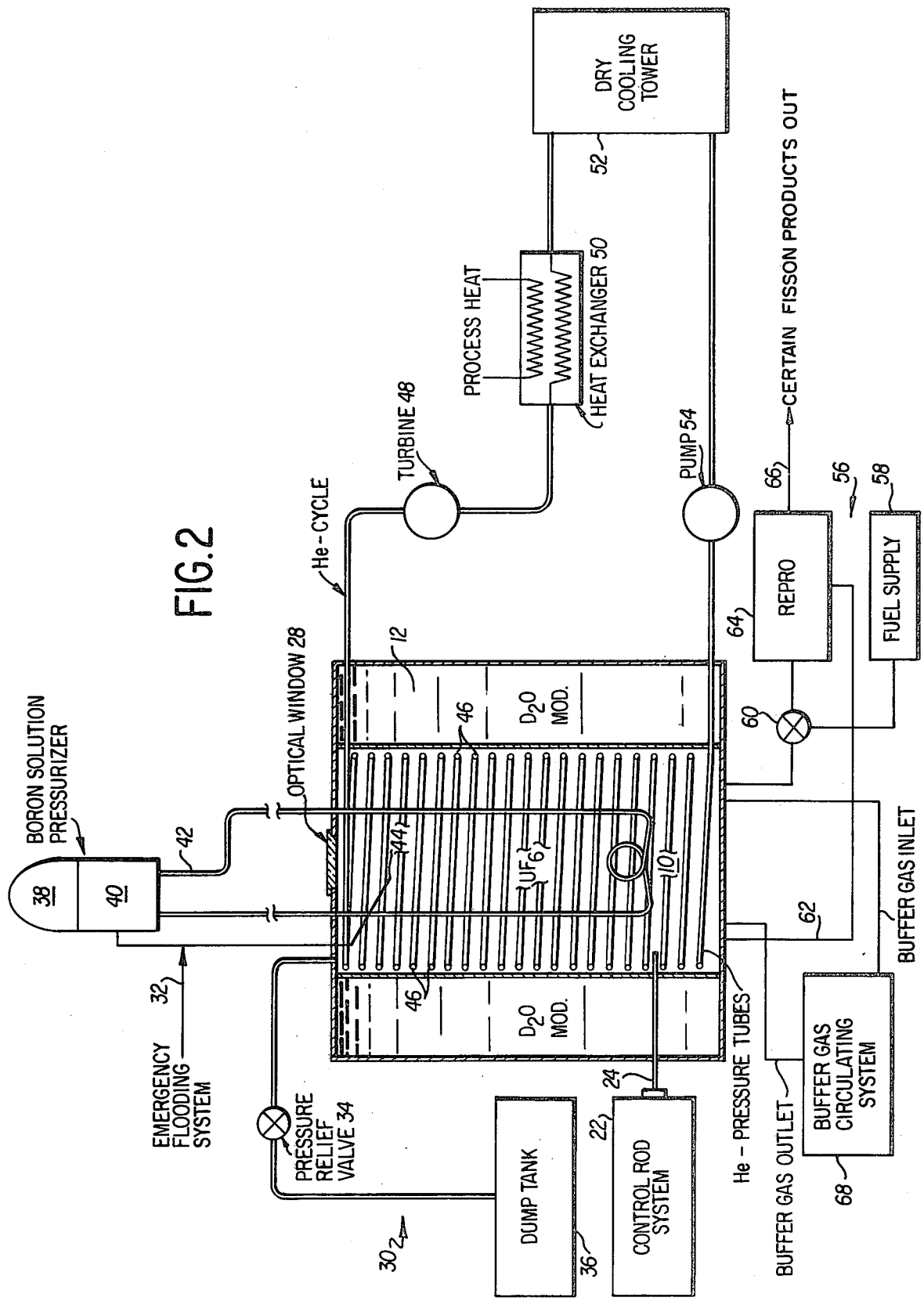

NON-EQUILIBRIUM RADIATION NUCLEAR REACTOR

ORIGIN OF THE INVENTION

The invention described herein was made in the performance of work under a NASA contract and is subject to the provisions of section 305 of the National Aeronautics and Space Act of 1958, public law 85-568 (72 Stat. 435; 42 U.S.C. 2457).

BACKGROUND OF THE INVENTION

1. Field of the Invention

The present invention relates to an externally moderated thermal nuclear reactor and more particularly to a gaseous fueled externally moderated thermal nuclear reactor developing non-equilibrium output radiation.

2. Description of the Prior Art

The need for practical sources of nuclear power has become acute in view of the diminishing reserves of fossil fuels. Thus substantial research and development activities have been devoted to developing and improving existing nuclear reactors. However many problems remain unsolved in the nuclear energy field.

For example, existing technology, which has been directed primarily to solid fuel fission reactors, has not supplied satisfactory solutions to the problems raised by the disposal of radioactive materials, such as transuranium actinides produced in all fission reactors. At the present time, these long-lived and potentially hazardous waste materials must be containerized and dumped or stored in suitable remote locations or must be reprocessed at great cost before they can be consumed in conventional reactor systems. Accordingly, conventional solid fueled reactors pose a serious problem in environmental control since they produce ever increasing quantites of radioactive waste materials.

A further problem area that has plagued nuclear reactor advocates is the safety hazard posed by conventional solid fueled reactors. The large inventory of fuel required to make solid fuel reactors operative always creates the threat of a catastrophe due to fuel melt down in case of loss-of-cooling accidents as well as the possiblity of criticality accidents. Furthermore, the elaborate safety systems required to prevent such accidents are extraordinarily expensive and add substantially to the cost of nuclear facilities.

Thus a need exists for a development in reactor technology which will eliminate or reduce these various disadvantages of prior technology.

Gas and plasma core reactors, proposed in the past, have offered only partial solutions to the problems noted above. Such previously proposed gas and plasma core reactors are projected for operation at high temperatures and pressures, providing output power largely in the form of conventional heat energy. Such previously proposed gas and plasma core reactors were conveived for high specific impulse propulsion in space; accordingly, their operation temperature is at 10,000 degrees and higher, and their power would be at 10,000 Megawatts and higher. Such previously known gaseous and plasma core reactor concepts have not satisfactorily resolved many of the safety and environmental problems mentioned above with regard to solid fueled reactors, and they are not practical as sources for continuous power because of too great temperatures, pressures and power.

A need therefore exists for further improvements in nuclear reactors, and especially in gaseous core reactors.

SUMMARY OF THE INVENTION

Accordingly, one object of the present invention is the provision of a novel externally moderated thermal nuclear reactor.

Another object of the present invention is the provision of a novel low temperature gas core reactor providing output energy in the form of electromagnetic radiation.

A still further object of the present invention is the provision of a gaseous core cavity reactor having at least a portion of its output in the form of light energy, operating over wide ranges of temperature.

Another object of the present invention is the provision of an externally moderated thermal nuclear reactor providing output power in the form of non-equilibrium electromagnetic radiation.

Yet another object of the present invention is the provision of a externally moderated thermal nuclear reactor capable of supplying output power in the form of coherent radiation.

A still further object of the present invention is the provision of a novel gaseous core cavity reactor forming a nuclear pumped laser.

Yet another object of the present invention is the provision of an improved gaseous fuel cavity reactor capable of consuming radioactive waste materials.

Another object of the present invention is the provision of a novel externally moderated thermal nuclear reactor requiring a minimum fuel inventory.

A still further object of the present invention is the provision of an externally moderated gaseous fuel thermal nuclear reactor of high efficiency having maximum fuel utilization and low thermal pollution.

Another object of the present invention is the provision of a novel gaseous fuel cavity reactor of extremely safe design with essentially no opportunity for criticality accidents.

Yet another object of the present invention is the provision of a novel gaseous fuel cavity reactor having complete tolerance for loss-of-cooling accidents.

Another object of the present invention is the provision of a novel gaseous fueled externally moderated thermal nuclear reactor having adaptability to an extremely wide range of power conversion systems.

Briefly, these and other objects of the invention are achieved by the provision of a reactor chamber surrounded by a reflecting and moderating material. A gaseous fuel is supplied to the cavity through an appropriate feed system. The temperature and pressure within the reactor cavity are selected to maximize the probability of non-elastic collisions between high energy fission products and surrounding atoms or molecules whereby power output in the form of electromagnetic energy is maximized. An optical resonator may be added to the device resulting in the emission of coherent radiation through lasing action. Provisions are made to recycle the gaseous fuel and selected radioactive waste products back to the reactor for burnup of such waste products.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
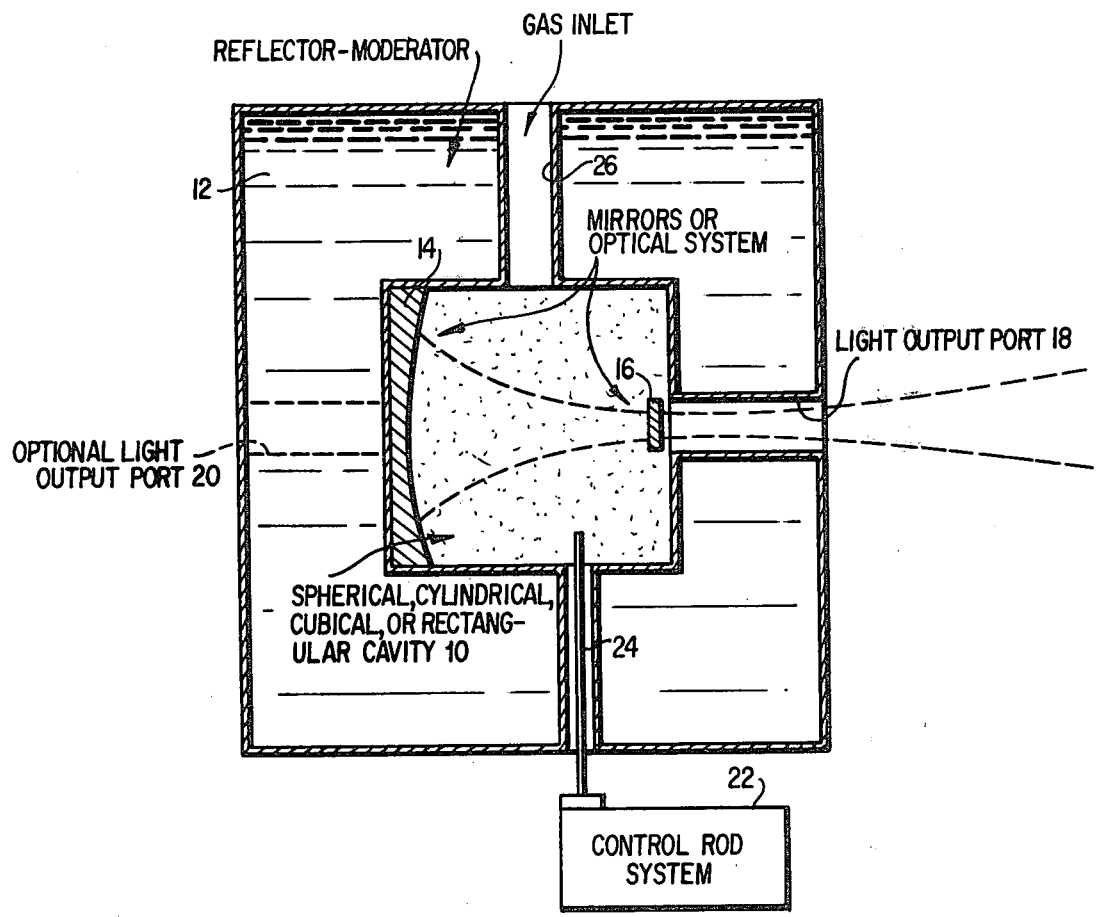
FIG. 1 is a schematic diagram of the cavity and moderator configuration of the gaseous core reactor of the present invention; and, FIG. 2 is a schematic diagram of a total functional system for use with reactor illustrated in FIG. 1.

Referring now to the drawings, wherein like reference numerals designate identical or corresponding parts throughout the several views, and more particularly to FIG. 1 thereof, the cavity or reaction chamber of the present invention is identified by the reference numeral 10. The cavity may be spherical, cylindrical, cubical or rectangular in cross-sectional configuration, and is contained within and surrounded by a reflector-moderator 12. The reflector-moderator may be formed of beryllium or may be beryllium, stainless steel or other conventional structure filled with heavy water. As an example of the general size and dimensions of the reactor chamber illustrated in FIG. 1, the cavity 10 may be on the order of one meter in diameter and one meter in length depending on its shape. Similarly, the reflector-moderator may be on the order of one-half meter thick. Naturally, it will be apparent to those skilled in the art that various different dimensions and thickness may be used depending upon desired power output and other conventional factors of reactors design.

An optical system consisting of a pair of mirrors 14 and 16 may optionally be installed in the cavity 10 in accordance with the nuclear pumped laser aspect of the present invention, as will be described in more detail subsequently. A principal light output port 18 sealed by an optically transparent medium, such as a suitable glass window (not shown) or a suitable fluid mechanical window device for light transmission in the vacuum is provided for permitting light generated within the cavity 10 to be transmitted to the exterior of the cavity for utilization as output power. An optical light output port 20 is also illustrated demonstrating the fact that plural light output ports may be used with invention and may be located at various points around the periphery of the cavity 10.

A conventional control rod system 22 may be used for controlling the introduction of one or more cadmium control rods 24 into the chamber 10 for controlling the reaction rate within the chamber. Similarly, rotating control drums containing boron poison plates may also be positioned around the periphery of the cavity 10 in the reflector-moderator structure for controlling the reactor.

A gaseous fuel inlet 26 is provided to permit the entry of a suitable fuel into the reactor. The preferred fuel is gaseous $UF_6$, although other volatile chemical compounds of uranium, plutonium, thorium and other fissile materials may also be used.

The gaseous core nuclear fission reactor of the present invention operates to directly convert fission fragment energy into non-equilibrium electromagnetic radiation, predominantly in the soft X-ray, ultra-violet, visible and infrared spectra. This radiation may be random or coherent depending upon the optics placed within the reaction chamber. Inelastic collisions between fission fragments and molecules, atoms and/or ions of the gaseous nuclear fuel material and/or selected admixtures of the gaseous fuel and one or more suitable gases provide the desired electromagnetic energy output through subsequent non-equilibrium de-excitation and recombination radiation. The non-equilibrium distribution of excited and ionic states in the gaseous nuclear fuel mixture (and its various admixtures) is brought about by adjusting the fuel gas density and temperature in the reactor such that the energy of the fission fragments is transferred predominantly by inelastic collisions so that only a lesser fraction of the fission fragment energy is dissipated by elastic collisions and converted into heat. The temperature range of the reactor should, for example, be maintained in the range from 100° to 3000° F and the pressure should be maintained between ⅛ and 100 atmospheres. Maintaining the reactor within these ranges and providing an optically thin fissioning medium increases the percentage of the energy output of the reactor which falls within the electromagnetic spectrum.

The non-equilibrium radiation nuclear reactor (abbreviated NERNUR) of the present invention is different from known gaseous core nuclear reactors for several reasons. For example, the spectral distribution of radiated power derived from the NERNUR deviates appreciably from the black body radiation of previously disclosed gaseous core nuclear reactors. Accordingly, the operating temperature of the NERNUR in producing non-equilibrium radiation is appreciably lower than the equivalent color temperature of previously disclosed gaseous core nuclear reactors. At this lower temperature, the pressure of the gaseous nuclear fuel is much lower than the pressure at which other gaseous core nuclear reactors must be maintained in order to maintain criticality. Because of the lower temperature and pressure of the gaseous nuclear fuel, the confinement of the fuel is accomplished more easily than with previously known gaseous core nuclear reactors. The low temperature of the gaseous nuclear fuel in the NERNUR permits it to be operated at a wide range of power levels, providing a number of advantages in constructing and utilizing the device. Furthermore, the lower temperature and pressure of the gaseous fuel and the resulting ease of confinement permits minimization of the critical mass of the gaseous fuel to a much greater extent than possible in other gaseous core reactors. Naturally, the fact that the fuel is in the gaseous phase also provides other advantages in permitting it to be continuously circulated and reprocessed for the elimination of radioactive waste, as will be explained in more detail subsequently.

Thus, as explained above, the NERNUR of the present invention is a self-critical gaseous fuel nuclear cavity reactor in which the energy of fission fragments resulting from nuclear chain reaction in the reactor is converted predominantly and directly into electromagnetic radiation primarily in the visable, infrared, soft X-ray and ultra-violet spectrum. By maintaining a low fuel density within the pressure and temperature ranges set forth above so that the fuel gas remains optically thin, inelastic collisions within a reactor can be maximized and elastic collisions can be minimized, whereby the heat output of the reactor is significantly reduced and the light or electromagnetic energy output thereof is maximized.

Although output energy from a reactor in the form of incoherent light is useful for many applications, such as large scale illumination and heating, it is also desirable that the output energy be converted into coherent light, creating in effect a nuclear pumped laser. One of the significant advantages of the NERNUR resides in the fact that it can easily be adapted to provide such coherent output radiation.

Nuclear-induced population inversion has been known to exist for some time (see for example "Population Inversions In Fission Fragment Excited Helium", ANS Transactions, volume 17, pages 3 and 4 1973). Thus a small percentage of the electromagnetic radiation generated by the NERNUR as described above could be expected to be in the form of coherent radiation. However to greatly enhance the percentage of coherent output radiation, an optical resonator, such as a Fabry-Perot cavity, may be included within the reactor cavity of the above described NERNUR apparatus. This resonator, comprising mirrors 14 and 16, for example, forces an increased percentage of the light emitting particles within the nuclear cavity to emit radiation in phase, producing coherent output radiation. The nuclear-pumped laser thus produced provides a powerful tool for use in optical communications, direct power transmission and many other fields, as will be apparent to those skilled in the art.

Having thus explained the general principles of the apparatus of the present invention, attention is now directed to FIG. 2 which discloses in more detail various fuel feed, control, safety and output systems used in conjunction with the gaseous core reactor of the present invention.

More particularly, the cavity or reaction chamber 10 of the NERNUR is illustrated in FIG. 2 as surrounded by a reflector-moderator 12 of heavy water. The reflector-moderator may, for example, be a suitable stainless steel tank filled with heavy water ($D_2O$). Naturally, other suitable materials and structural configurations could also be used for the reflector-moderator. An optical window 28 is illustrated as the equivalent of the light output port 18 of FIG. 1, and is intended to provide an output path for electromagnetic and optical power developed within the reactor. An optical resonator of the type described previously may naturally be added to the structure illustrated in FIG. 2 for the purpose of providing coherent output radiation, but this has not been shown to simplify the drawing.

A pressure relief system 30 and an emergency flooding system 32 are provided to prevent the reactor from running out of control. The pressure relief system 30 includes a pressure relief valve 34 coupled to a dump tank 36, whereby the contents of the reaction chamber 10 pass through the relief valve 34 into the dump tank if pressure within the reaction chamber exceeds a predetermined safe limit. The emergency flooding system 32 includes a boron solution pressurizer 38, coupled to and providing motive pressure for a boron solution reservoir 40. The reservoir 40 is coupled by means of a suitable piping system 42 to the interior of the reaction chamber 10 for flooding the reaction chamber when chamber temperature or other parameters exceed predetermined safe limits. A chamber condition monitor 44 is positioned within the reaction chamber for monitoring the temperature or other relevant parameters within the reaction chamber and for controlling the emergency flooding system depending upon conditions sensed. The details of the pressure relief system and the emergency flooding system are all well known to those skilled in the art as the systems are conventional and are comprised of conventional components. Thus no detailed description of the individual components comprising the systems will be necessary for those skilled in the art.

The control rod system 22 illustrated in FIG. 1 is also illustrated in FIG. 2 representing the conventional manner of controlling the reaction rate within the cavity 10.

A cooling system using gaseous helium as a cooling fluid is illustrated as including a helically coiled cooling tube 46 surrounding the inner periphery of the reflector-moderator 12. It will be understood, of course, that although helium gas is the preferred cooling fluid, other conventional cooling fluids may also be used. The cooling system is necessary since all fission fragments cannot be induced to undergo inelastic collisions, and thus a significant amount of heat energy is produced within the reactor. However, this heat energy can be used beneficially by the provision of suitable energy conversion equipment. For example, the cooling system is illustrated as including a turbine 48, a heat exchanger 50 and a dry cooling tower 52. These three elements represent different conventional techniques for removing heat energy from the reactor system and may be replaced by alternative conventional structures or heat transfer apparatuses. The turbine 48 represents a conventional means of extracting mechanical power from the helium cooling network, while the heat exchanger represents a fluid dynamic or other nonmechanical technique for extracting useable heat from the reactor. The dry cooling tower 52 represents yet another nonmechanical apparatus for removing residual heat from the reactor cooling network. Clearly, all these heat extracting components can be used to derive useful output energy from the reactor system in addition to the energy removed from the system in the form of optical or electromagnetic radiation. A pump 54 is provided for circulating the cooling fluid throughout the cooling system.

A fuel feed system 56 is illustrated for delivering gaseous fuel to the reactor and for reprocessing partially reacted fuel. The fuel feed system includes a fuel supply 58 comprising a conventional reservoir of $UF_6$ or another suitable gaseous fissile fuel, which is fed through a mixing valve 60 to the reactor chamber 10, through a gas inlet 26 as illustrated in FIG. 1, for example. Partially or completely reacted fuel gas intermixed with fission products is withdrawn from the reactor through an exhaust line 62 to be fed to a reprocessing unit 64 comprised of conventional components. The reprocessing unit permits continuous recirculation of the gaseous nuclear fuel while fission products ($Sr^{90}$, $Zr^{93}$, $Tc^{99}$, $Cs^{135}$, $Cs^{136}$, etc.) are continuously separated and delivered through a line 66 to a suitable waste facility. The reprocessing unit 64 also separates the radioactive actinides ($Ra^{226}$, $Th^{229}$, $Pu^{238}$, $Pu^{239}$, $Am^{241}$, $Cm^{244}$, $Cm^{245}$) and recirculates them through the mixing valve 60 back into the reaction chamber 10. These antinides have very long radioactive half lives and represent the most serious problem of long term radioactive waste management in conventional reactor systems. However, in the system of the present invention these actinides are fed back into the reactor to be burned and destroyed by fission processes. Accordingly, the reactor of the present invention reaches an equilibrium condition in which actinides represent a fixed percentage of the total reactor fuel inventory. After this equilibrium condition is reached, the reactor of the present invention may be operated indefinitely without any further net production of such actinides.

Suitable non-fissioning gases may also be added to the fuel gas to enhance the output of electromagnetic energy and to further optimize the performance of the NERNUR reactor. Such gases include all of the noble gases either individually or in various mixtures, as well as CO, $CO_2$ and other gases possessing similar characteristics.

An optional buffer gas circulation system 68 is illustrated for circulating a buffer gas, such as one of the noble gases, around the inner-periphery of the reflector-moderator 12. The purpose of this buffer gas is to separate the fuel gas from the walls of the reflector-moderator in order to minimize the corrosive effect of the fuel gas thereon. The buffer gas may be necessary in instances where the fuel gas is a highly corrosive compound such as $UF_6$. In instances where the fuel gas is not corrosive, or where in the reflector-moderator structure is formed of a material which is not attacked by the fuel gas, the buffer gas circulating system may be eliminated.

The NERNUR reactor of the present invention provides a number of advantages over both solid fuel and gaseous core reactors known in the past. For example, important economic benefits are derived from the use of fuel in its gaseous state since there is no need for fabricating solid fuel elements which require the use of high cost alloys, expensive quality assurance activities and great care in shipment. Furthermore, fuel bred in the blanket of the reactor can be separated and incorporated directly into the reactor fuel cycle in the apparatus of the present invention, thereby eliminating special shipping costs and costs affiliated with safe-guarding fissile materials. Furthermore, the structure of the present invention requires only one relatively small critical mass in the reactor, so that the large fuel inventories and associated controls required with conventional solid fuel reactors may be eliminated.

The reactor of the present invention is also attractive from the safety point of view. More particularly, in the system of the present invention, the gaseous nuclear fuel is continuously cycled through the reactor. Fission products can therefor be continuously separated from the fuel flow, resulting in a minimal concentration of radioactive waste in the reactor core which could escape from the reactor if an accident should occur. Consequently, measures for preventing these materials from escaping into the environment in the event of an accident can be reduced in the context of the present invention. Furthermore, in view of the small inventory of fission products involved in the operation of the present invention, melt-down problems have been substantially eliminated, so that the cost and difficulty of providing adequate emergency core-cooling systems is reduced. Furthermore, with the use of gaseous fuel, a catastrophic reactor runaway is essentially impossible.

The reactor system of the present invention also provides significant advantages in the field of environmental protection in that it permits the most dangerous nuclear products to be recycled and at least partially destroyed. Furthermore, in the present gaseous core reactor a much higher than normal flux of thermal neutrons exists ($5 \times 10^{15}$ n/s-cm$^2$, for example,), which accelerates the process of consuming nuclear waste materials. In addition, the energy output of the present invention in the form of electromagnetic energy particularly in the visible light spectrum, provides a particularly small chance of environmental pollution due to any escaping energy transfer medium, such as heated water, steam or other commonly used media.

A further advantage of the present invention lies in the wide range of temperatures at which it can be operated and in the wide range of power outputs available. This wide range of operating parameters permits the apparatus of the present invention to be used for the production of large and small power outputs in combination with many different types of communications and power generating systems.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A gaseous core nuclear reactor operating at wide ranges of temperature and pressure generating output power primarily in the form of non-equilibrium electromagnetic energy, comprising:
   a centrally located reaction chamber,
   reflector-moderator means surrounding said reaction chamber,
   fuel inlet means in said reflector-moderator for admitting a gaseous fissile fuel to said reaction chamber for providing an optically thin fissioning medium in said reaction chamber,
   control means cooperating with said reaction chamber for controlling the reaction rate therein;
   power output means mounted in said reflector-moderator for permitting said non-equilibrium electromagnetic energy to be transmitted from said reaction chamber to the exterior of said reactor, said power output means comprising at least one optically transparent window; and
   means for maintaining the temperature of such reaction chamber between 100° and 3000° F.

2. A gaseous core nuclear reactor as in claim 1, further comprising:
   optical resonator means positioned within or exterior of said reaction chamber for stimulating the emission of coherent radiation from said reactor.

3. A gaseous core nuclear reactor as in claim 1, further comprising:
   a fuel feed means for delivering gaseous fuel to said reactor and for reprocessing partially reacted fuel.

4. A gaseous core nuclear reactor as in claim 3, wherein:
   said fuel feed means further includes means for separating radioactive actinides and fission products for recirculating said radioactive actinides to said reaction chamber.

5. A gaseous core nuclear reactor as in claim 1, further comprising:
   buffer gas circulating means for circulating a buffer gas around the periphery of said reaction chamber for separating said gaseous fissile fuel from the walls of said reaction chamber.

6. A gaseous core nuclear reactor as in claim 1, further comprising:
   pressure relief means coupled to said reaction chamber for preventing said reactor from attaining a pressure above a predetermined level,
   monitoring means mounted to said reflector-moderator means for monitoring a selected parameter within said reaction chamber; and emergency flooding means coupled to and controlled by said monitoring means for quenching said reactor when said selected parameter exceeds a predetermined value.

7. A gaseous core nuclear reactor as in claim 1, further comprising:
a cooling means within the inner periphery of said reflector-moderator means, and
energy conversion means coupled to said cooling means for removing heat energy therefrom.

8. A method of producing non-equilibrium radiation using a nuclear reactor, comprising the steps of:
providing an optically thin gaseous fissile fuel in a reaction chamber of said nuclear reactor,
maintaining a critical mass of said fissile fuel within said reaction chamber so that self-sustaining nuclear fission occurs within said reaction chamber,
maintaining the temperature within said reaction chamber between 100° and 3000° F; and,
providing said reactor with an optically transparent window for permitting said non-equilibrium radiation to be transmitted from said reaction chamber to the exterior of said reactor.

9. A method as in claim 8 further comprising the steps of:
providing an optical resonator within said reaction chamber for stimulating the emission of coherent radiation.

10. A method as in claim 8, further comprising the step of:
circulating a buffer gas around the periphery of said reaction chamber to separate said gaseous fissile fuel from the walls of said reaction chamber.

11. A gaseous core nuclear reactor as in claim 1, further comprising:
means for maintaining the pressure of said reaction chamber between ⅓ and 100 atmospheres.

12. A gaseous core nuclear reactor as in claim 7, wherein:
said cooling means includes a helically coiled cooling tube surrounding the inner periphery of said reflector-moderator means; and
means for circulating a gaseous cooling fluid through said cooling system.

13. A gaseous core nuclear reactor as in claim 4, further comprising:
a cooling means within the inner periphery of said reflector-moderator means which is separate and distinct from said fuel feed means.

14. A method as in claim 8, further comprising the step of:
maintaining the pressure within said reaction chamber between ⅓ and 100 atmospheres.

15. A method as in claim 14, wherein:
said temperature and pressure within said reaction chamber is selected within said ranges to substantially maximize the probability of non-elastic collisions between high energy fission fragments and surrounding atomic, ionic and molecular species whereby the production of non-equilibrium radiation within said reactor is substantially maximized.

16. A method as in claim 8, further comprising the steps of:
continuously recirculating said gaseous fissile fuel,
seperating fission products and radioactive actinides that are present in said recirculating fuel,
returning said radioactive actinides to said reaction chamber to be destroyed by nuclear fission; and,
discarding said fission products 17. A gaseous core nuclear reactor as in claim 1, wherein:
said gaseous fissile fuel includes uranium hexafluoride.

18. The method as in claim 8, wherein:
said gaseous fissile fuel includes uranium hexafluoride.

* * * * *